United States Patent [19]

Jovanovic

[11] Patent Number: 4,519,648
[45] Date of Patent: May 28, 1985

[54] ARRANGEMENT FOR ENABLING A PIVOTAL MOUNTING OF A TRAY TO A SEAT BACK OF A SEAT OF A PASSENGER MOTOR VEHICLE

[75] Inventor: Nenad Jovanovic, Munich, Fed. Rep. of Germany

[73] Assignee: Bayerische Motoren Werke AG, Fed. Rep. of Germany

[21] Appl. No.: 400,256

[22] Filed: Jul. 21, 1982

[30] Foreign Application Priority Data

Aug. 1, 1981 [DE] Fed. Rep. of Germany ....... 3130566

[51] Int. Cl.³ ................................................ B60N 3/00
[52] U.S. Cl. ........................................ 297/146; 108/6;
 248/293; 297/169; 297/191; 403/92
[58] Field of Search ............... 297/146, 163, 164, 169, 297/173, 191; 108/2, 8, 48; 248/284, 291, 293; 403/92, 93, 96; 296/37.1

[56] References Cited

U.S. PATENT DOCUMENTS 2,619,395 11/1952 Kent ................................ 297/146 X
2,653,036 9/1953 Creel et al. ...................... 248/293 X
2,963,078 12/1960 Ferrelle ............................... 297/146
3,550,891 12/1970 Scott .................................. 248/291 X

FOREIGN PATENT DOCUMENTS 164533 12/1980 Japan ................................... 297/169

Primary Examiner—Victor N. Sakran
Assistant Examiner—Peter R. Brown
Attorney, Agent, or Firm—Craig and Burns

[57] ABSTRACT

A device for enabling a pivotal arrangement of a tray or table top at a seat back or back portion of a passenger seat, especially a motor vehicle seat. The device is adapted to enable an adjustment of an inclination of the tray or table top as soon as the tray or table top has been pivoted into a substantially horizontal in-use position. The adjustment may be effected by toothed segments attached to the tray and back of the passenger seat or it is also possible for effecting adjusting by setscrew arrangements devised to press against a forward edge of the tray. The setscrew arrangements may be connected to one another by a drive or connecting belt so as to enable a simultaneous operation of the setscrew arrangements.

16 Claims, 12 Drawing Figures

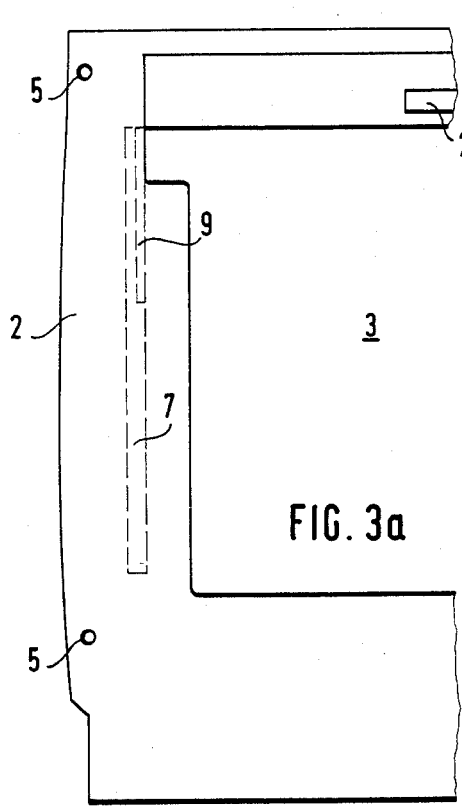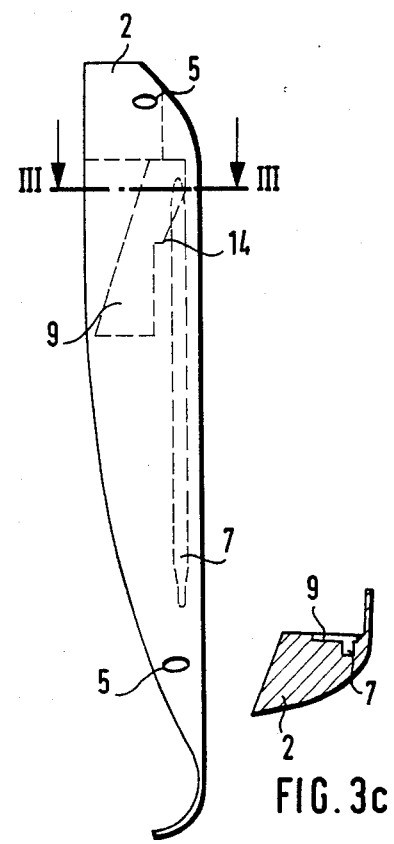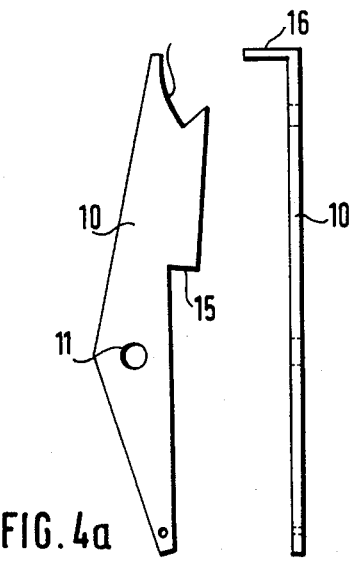

ARRANGEMENT FOR ENABLING A PIVOTAL MOUNTING OF A TRAY TO A SEAT BACK OF A SEAT OF A PASSENGER MOTOR VEHICLE

The present invention relates to a pivot device and, more particularly, to an arrangement for pivoting a tray at a back of a passenger seat, especially a motor vehicle seat.

Under practical conditions, with folding trays, an inclination of the tray, pivoted into a horizontal in-use position, normally cannot be adjusted or can only be adjusted in a cumbersome manner. However, an adjustment of the inclination of the tray is desireable since, on the one hand, the inclination of the tray depends upon a position of the backrest portion of the seat and, on the other hand, some other inclination may be required depending upon the purpose for which the tray is to be utilized.

The aim underlying the present invention essentially resides in providing a pivotal arrangement for a tray at the back of the passenger seat which enables an adjustment of the inclination to respectively desired in-use positions in a simple and rapid manner.

In accordance with advantageous features of the present invention, an effective adjusting means is provided between a back of the seat and the tray for enabling an adjustment of the inclination of the tray folded into an in-use position.

In accordance with still further features of the present invention, at least one toothed segment is mounted to a forward edge of the tray, with the toothed segment being adapted to mesh with the tray when the tray is in a folded down position, and with a corresponding toothed segment being fixedly located in a rear area or side of the back rest portion of the seat.

At least one fastener means in the form of a set screw is, advantageously, fixedly mounted in a rear area or side of the back rest portion of the seat, with the folded down tray being adapted to contact the fastener in a zone of the forward edge of the tray.

The fastener, i.e., set screw, includes a nut and a threaded bolt, with the nut being mounted so as to be rotatably movable but axially fixed, and a threaded bolt pressing with a bearing surface against the folded down tray.

It is also possible in accordance with the present invention to provide a fastener means which includes two set screws, each of which have nuts connected to each other by way of a drive means such as, for example, a drive belt.

Each nut of the fastening or set screw arrangement has, at a circumference thereof, radially projecting pins at regular intervals so as to enable the drive means to be constructed as a perforated belt having a succession of holes or openings corresponding to a spacing of the pins provided on the respective nuts.

Advantageously, an opening may be provided in the rear portion or side of the backrest portion of the seat with the tray, which is adapted to be pivoted into a horizontal in-use position, being adapted to be pulled upwardly and folded down and being inserted in the opening in such a manner that the tray serves as a cover for the opening.

The tray, may, in accordance with the present invention, be guided in a conventional manner by means of guide elements in two longitudinal grooves, with the guide elements being attached on longitudinal sides of the tray and at a spacing from a forward edge of the tray. The longitudinal grooves may be attached or secured in a rear portion of a rear side of the back rest of the seat on both sides of the opening and extend in a vertical direction essentially over an entire length of the opening. A spring loaded pawl means may be provided at an upper end of at least one longitudinal groove, with the corresponding guide element engaging such pawl when the tray is folded down.

At least one of the longitudinal grooves extends or passes over an upper portion thereof into a pocket or recess for accommodating the pawl.

Advantageously, in accordance with still further features of the present invention, the pawl is constructed as a two-armed lever and is supported with a central section rotatably in the pocket or recess. A first lever arm of the pawl forms a draw-like cutout at an end thereof for accommodating the guide element of the tray, with the pawl being pretensioned by way of, for example, a spring engaging at an end of the second lever arm of the two armed pawl.

The pawl may, for example, at the end of the first lever arm include a tang or the like bent in a direction of the tray. A projection, serving as an abutment, may be formed in the pocket or recess, with an inner shoulder corresponding thereto being provided in the pawl.

Tooth segments are, advantageously, arranged in an immediate vicinity of the pawl, and the guide elements may be displacable realtive to the tray in a longitudinal direction of the latter against a biasing spring force.

The tray may be provided with an oblong passage bore extending in parallel to a forward edge, with a dimensionally stable rod being arranged in the bore in such a manner that it projects on both sides of the tray and forms, by way of its projecting ends, the guide elements.

The dimensionally stable rod may be inserted into the passage bore under the action of a biasing means such as a spring.

Advantageously, a reading lamp or the like may be provided on a rear side of the seat back in an upper zone of the opening and, a rear portion or rear side of the seat back of the seat may be formed by a dimensionally stable molding attached to the seat back, with the tray being seated or accommodated in the molding.

By virtue of the noted features of the present invention, a tray arrangement can be provided which may be adjusted within a wide range of positions so as to assume any desired angle of inclination. In, for example, motor vehicles, the vehicle seats normally are equipped with folding trays only upon special request or special order. In this case, it is advantageous to construct the device of the present invention so that the tray is disposed in a dimensionally stable molding which may, for example, be fashioned of a synthetic resin thereby enabling the molding to be readily attached as a rear side of the back of the seat without having to modify the construction of the vehicle seat.

Moreover, with a tray constructed in accordance with the present invention, in a stowed position, the tray forms together with the rear side of the seat, an essentially uniform surface without any projecting edges or corners thereby reducing the risk of injury to the passenger in case of, for example, an accident of the like.

Accordingly, it is an object of the present invention to provide a device for a pivotal mounting of a tray to a seat back of a passenger seat which avoids, by simple means, shortcomings and disadvantages encountered in the prior art.

Another object of the present invention resides in providing a device for enabling a pivotable mounting of a tray to a seat back of a passenger seat, especially a passenger seat of a motor vehicle, which enables an adjustment of an angle of inclination of the tray when the tray is in a use position.

Another object of the present invention resides in providing a device for a pivotal mounting of a tray to a seat back of a seat back of a passenger motor vehicle seat which is simple in construction and therefore relatively inexpensive to manufacture.

A still further object of the present invention resides in providing a device for enabling a pivotal mounting of a tray to a seat back of a passenger motor vehicle which may be readily mounted on the seat without substantially modifying or altering the basic seat construction.

A still further object of the present invention resides in providing a device for enabling a pivotal mounting of a tray to a seat back of a passenger seat which enables the tray to be moved to a stowed or inoperative position so as to form a uniform surface with a rear side of the seat.

These and other objects, features, and advantages of the present invention will become more apparent from the following description when taken in connection with the accompanying drawing which shows, for the purpose of illustration only, several embodiments in accordance with the present invention, and wherein:

FIG. 3a is a partial front view of a molding for the tray of the present invention;

FIG. 3b is a lateral view of the molding of FIG. 3a;

FIG. 3c is a cross sectional view taken along the line III—III in FIG. 3b;

FIG. 4a is a front view, on an enlarged scale, of a pawl for the device of the present invention;

FIG. 4b is a lateral view of the pawl of FIG. 4a;

FIG. 5b is a front view of a tray of FIG. 5a;

Figure 1:
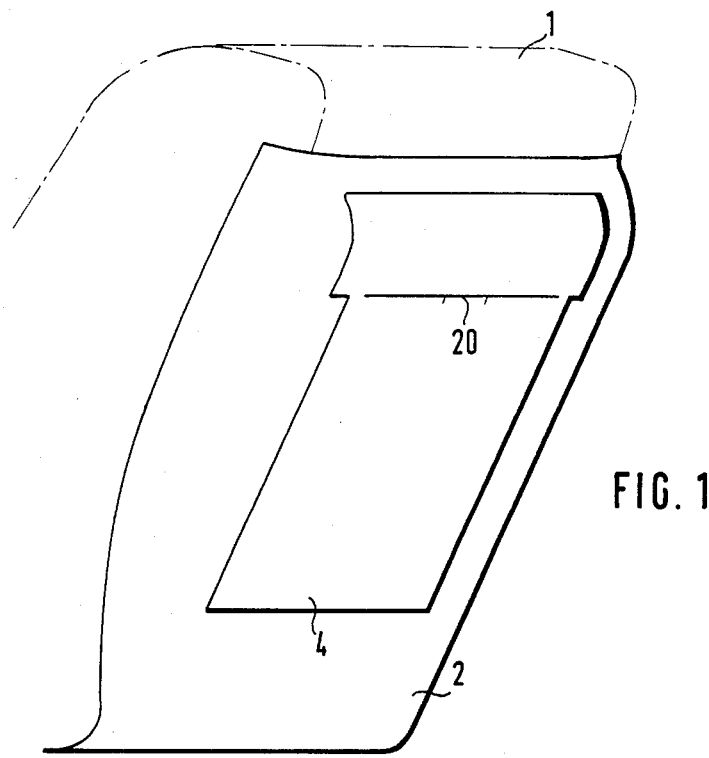
FIG. 1 is a schematic view of the back of a passenger seat with a tray arrangement constructed in accordance with the present invention in a stowed position.

Referring now to the drawings wherein like reference numerals are used throughout the various views to designate like parts and, more particularly, to FIGS. 1–4b, according to these figures, a passenger seat of, for example, a motor vehicle, (not shown) includes a back rest portion 1 and has mounted thereon a dimensionally stable molding 2 preferably made of, for example, synthetic resin. As shown in FIG. 3a, the molding 2 includes an opening 3 adapted to accommodate a tray 4, with the tray 4 being insertable into the opening 3 so as to serve as a cover for the opening 3. The molding 2 is attached to the backrest portion 1 of the vehicle passenger seat by means of suitable fasteners such as, for example, screws which are accommodated in screw holes 5 divided in the molding 2. Since the tray 4 may be frequently utilized as a writing table of a reading support, an appropriate reading lamp 27 may be provided in the molding 2 in an upper area of the opening 3.

Figure 2:
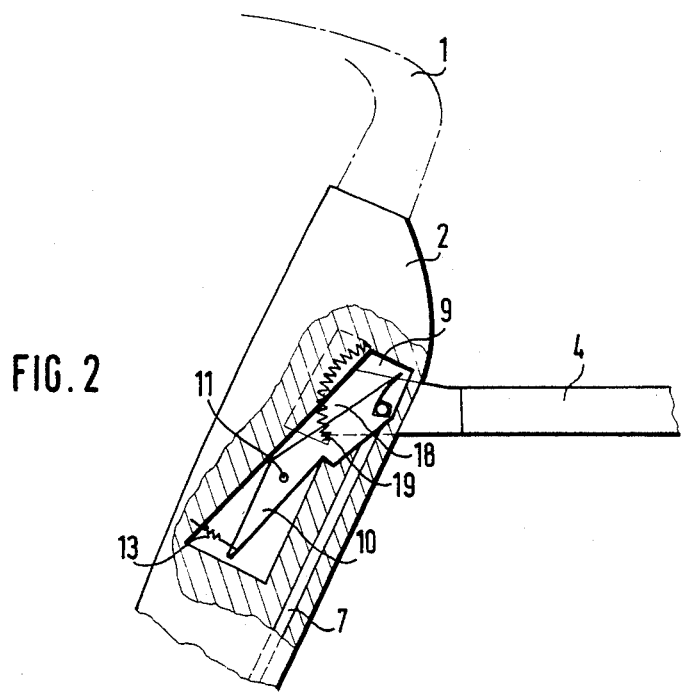
FIG. 2 is a partial cross sectional view of a portion of the back of the passenger seat of FIG. 1 with the tray being pivoted into an in-use position.

The tray 4 is adapted to be pivoted into a horizontal in-use position by pulling the tray 4 upwardly and flipping the tray down. For this purpose, as shown most clearly in FIG. 5b, at least guided element 6a, 6b is provided along respective longitudinal sides of the tray 4 by means of which the tray 4 is guided in a longitudinal grooves 7 (FIGS. 2, 3a, 3b). The longitudinal grooves 7 are arranged in the molding 2 on both sides of the opening 3 and extend in a vertical direction essentially over an entire length of the opening 3. The guide elements 6a, 6b may be formed by projecting ends of a dimensionally stable rod or bar 6 extending over an entire length of a passage bore 8 (FIG. 5b) provided in the tray 4. The passage bore 8 extends in parallel to a forward edge 4a of the tray 4 and at a position spaced therefrom. The forward edge 4a is the edge which rests against the seat back 1 when the tray 4 is in a folded down or in-use position.

Each of the longitudinal grooves, at upper portions thereof, pass over or are formed with pockets 9 with each pocket accommodating a pawl or safety catch 10. As shown most clearly in FIGS. 4a, 4b, the pawls 10 are constructed as two armed levers and are rotatably mounted in the respective pockets 9 by a central section 11. The first lever arm of the pawl or safety catch 10 has a jaw-like cutout 12 and, at an end of the second lever arm, as shown most clearly in FIG. 2, a spring 13 is provided which engages the end of the second lever arm and maintains the pawl or safety catch 10 in the respective pockets 9 in a pretensioned condition. A projection 14 (FIG. 3b) is formed within each of the pockets 9, with the projection 14 serving as an abutment means for the pawl or safety catch 10 and, for this purpose, the pawl or safety catch 10 is provided with an inner shoulder 15 cooperable with the projection 14.

If the tray 4 is pulled upwardly and folded down, the guide elements 6a, 6b engage in the jaw-like cutouts 12 of the respective pawls or safety catches 10 and thereby is fixed in position and cannot slip out in a downward direction. Moreover, the jaw-like cutouts 12 serve as bearing points for the rotatable support of the tray by way of the guide elements 6a, 6b.

In order to be able to stow the tray 4 in a rest position from its in-use position, the pawls or safety catches 10 must be disengaged and, for this purpose, each of the pawls or safety catches 10 include a tang or bent arm portion 16 located at an end of the first lever arm at a position above the jaw-like cutout 12. The tang or bent arm 16 is disposed so that it rests on a surface of the tray 4 when the tray is in a folded down position. When the tray 4 is returned to a stored position, the tray is first pivoted in an upward direction and, thereby, the pawls or safety catches 10 are turned, by way of the tangs or bent arms 16, in the rearward direction until they release the guide elements 6a, 6b. Then, the tray 4 may be lowered into the rest position.

Figure 5A:
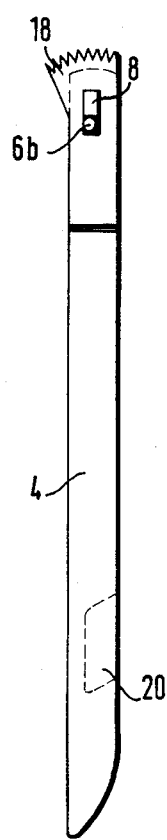
FIG. 5a is a lateral view, on an enlarged scale of a tray constructed in accordance with the present invention.
Figure 5B:
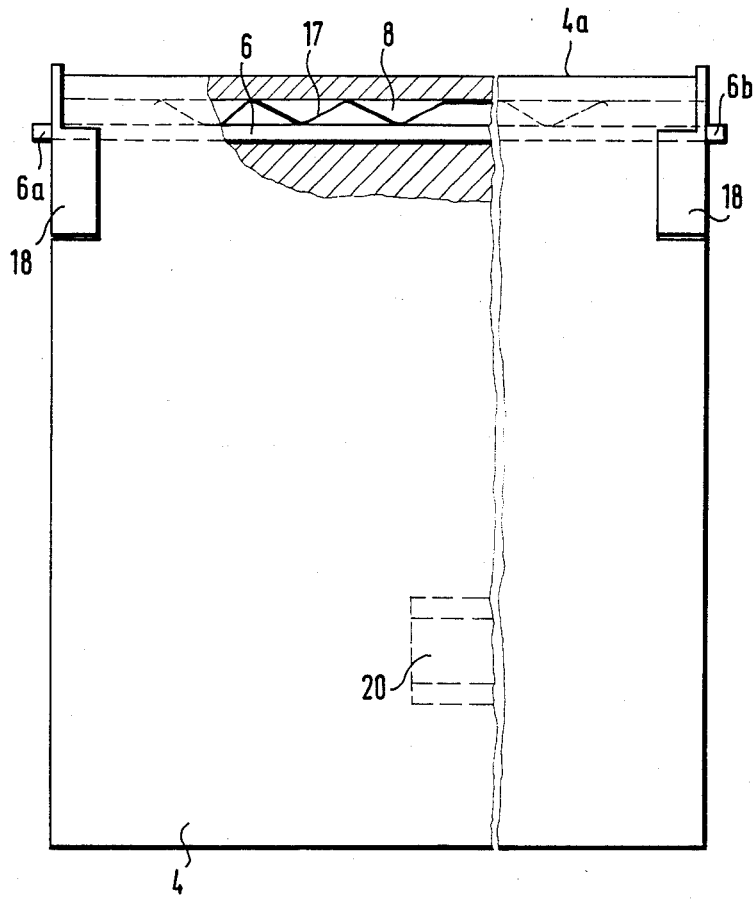

As shown most clearly in FIGS. 5a, 5b the passage bore 8 has an oblong cross sectional configuration and is aligned with this cross sectional shape in a longitudinal direction of the tray 4. A biasing means such as, for example, a leaf spring 17 is arranged in the passage bore 8 and is adapted to urge or bias the dimensionally stable rod 6 against the wall of the passage bore remote from the forward edge 4a of the tray 4. By virtue of this arrangement, the dimensionally stable rod 6 and the ends thereof serving as the guide element 6a, 6b may be shifted against the force of the leaf spring 17 with respect to the tray 4 in a longitudinal direction of the latter.

The tray 4 is provided with at least one toothed segment 18 along each longitudinal side in the zone of the forward edge 4a, with the toothed segments 18 extending around the tray 4 with a U-shaped mounting section and attached to the tray 4 at that location. The mounting of the toothed segments may be effected by means of suitable fasteners such as screws or the like or in some other manner. The toothed segments 18 have perforations for enabling a penetration of the guided elements 6a, 6b, with the teeth of the toothed segments 18 projecting beyond the forward edge 4a and meshing with teeth of corresponding toothed segments 19 fixedly mounted in the molding 2 as shown most clearly in FIG. 2. The toothed segments 19 in this arrangement are located in an immediate vicinity of the pawls or safety catches 10.

If a passenger wishes to pivot the tray 4 into an in-use position, the tray 4 is first pulled upwardly from the rest position shown in FIG. 1 with the aid of a recessed handle 20 and then the tray 4 is folded into the desired position by simultaneously pulling the tray 4 toward the body of the passenger. The passenger then releases the tray 4 and the leaf spring 17 urges the tray 4 forward until the toothed segments 18, 19 mesh with each other.

The tooth configuration of the toothed segments 18, 19 is selected so that unintentional further ratcheting is avoided in case a load is placed on the tray 4. If the passenger wishes to adjust the inclination of the tray 4, it is merely necessary for the passenger to pull the same toward the passenger and pivot the tray into a desired adjusted position and, then release the tray 4 once again.

When the tray 4 is to be stored away, the above noted manipulations take place in the reverse order, that is, the tray 4 is pulled in a direction of the passenger, flipped upwardly, and allowed to slide down into the rest position.

Figure 6:
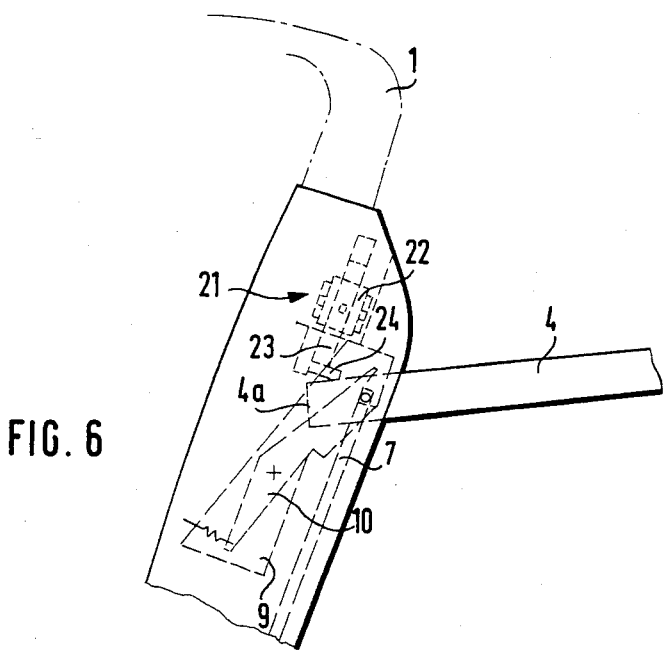
FIG. 6 is a partially schematic view of a portion of a back of a passenger seat with a tray arrangement constructed in accordance with another embodiment of the present invention pivoted into an in-use position.
Figure 7:
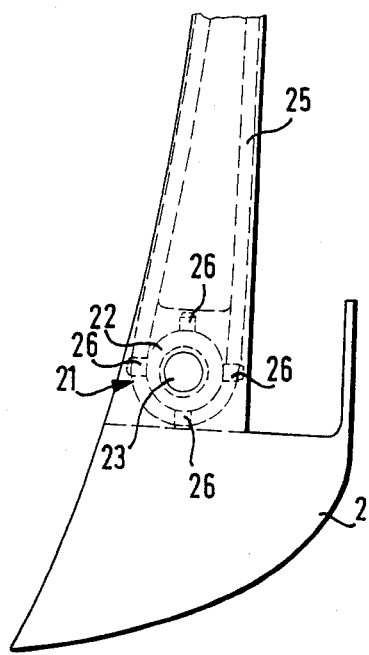
FIG. 7 is a partial top view of FIG. 6.
Figure 8:
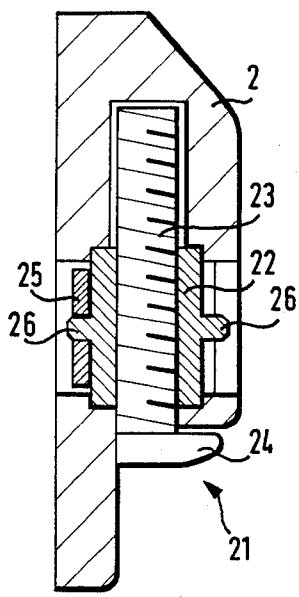
FIG. 8 is an enlarged cross sectional detail view of FIG. 6.

FIGS. 6–8 provide an illustration of a second embodiment in accordance with the present invention and, according to these Figures two setscrews 21 are arranged in the molding at a position above the opening 3. For reasons of simplicity, only one setscrew 21 is illustrated in the drawings; however, the setscrews are symmetrically disposed with respect to the opening 3. The tray 4, in a flipped down or in-use position is adapted to rest on the setscrews 21 in corner areas thereof in a zone of the forward edge of the tray 4. Each setscrew includes a nut 22 and a threaded bolt 23 which is adapted to press a bearing surface 24 against the tray 4. The nut 22 is rotatably mounted in the molding 2 but is axially fixed in its location. The threaded bolt 23 of each of the setscrews 21 is adapted to be adjusted in an axial direction by rotating the nut 22.

As shown in FIG. 7, wherein only the molding 2 without the tray 4 and seat back 1 is illustrated, a drive means in the form of a drive or connecting belt 25 may be looped about the nuts 22 of the respective setscrews 21. The drive or connecting belt 22 is adapted to serve for a simultaneous operation of the two nuts 22 of the set screws 21. For this purpose, the drive or connecting belt 25 is constructed as a perforated belt and the nuts are each provided with pins 26 along an outer periphery thereof which are adapted to engage in the perforations in the drive or connecting belts 25. The pins 26 project radially outwardly from the circumference of each nut 22 at uniform intervals and have a mutual spacing corresponding to the succession of holes in the drive belt 25.

If a passenger wants to adjust the inclination of the folded down tray in the construction of FIGS. 6–8, the passenger moves or displaces the drive or connecting belts 25 to the left or right depending upon the circumstances and thereby the nuts 22 of the setscrews 21 are rotated and the threaded bolts 23 are axially displaced. Since the threaded bolts act with the bearing surfaces 24 on the tray 4, the tray 4 is then pivoted into a desired adjusted position. In order to enable an operation of the drive or connecting belts 25, an opening may be provided in the molding 2 through which the belt can be moved directly by hand; however, it is more advantageous to utilize an adjusting element (not shown) which acts on the drive belt.

As can readily be appreciated, it is also possible to arrange the tray 4 directly at the seat back 1 without providing a molding; however, in such a construction, the seat back 1 would have to be of a corresponding structural design so as to enable an accommodation of the tray arrangement of the present invention.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. An arrangement for enabling a pivotal mounting and generally horizontal positioning of a tray relative to a back of a seat, the tray being operatively shiftable between a stowed position and an in-use position, the arrangement comprising a tray having a forward edge and adjustment means for enabling an effective adjustment of inclination of the tray when the tray is in the in-use position, said adjustment means including first means disposed proximate the forward edge of the tray and second means disposed on the back of the seat, the first means of the adjustment means including at least one toothed means mounted at the forward edge of the tray and the second means including a second toothed means fixedly disposed at a rear side of the back of the seat, said first and second toothed means being adapted to be brought into meshing engagement when the tray is in the in-use position, said seat back including an opening for accommodating the tray in the stowed position, said tray serving as a means for covering the opening when the tray is in the stowed position, guide means associated with said seat back for guiding the tray from the stowed position to the in-use position, said guide means operatively enabling the tray to be pivoted into the in-use position by being pulled upwardly and folded down, the guide means including a pair of vertically extending groove means provided on respective lateral sides of the opening and extending essentially over an entire length of the opening, guide elements disposed at respective lateral sides of the tray at a position spaced from the forward edge thereof, and a biased pawl means associated with the upper end of at least one of the groove means for engaging one of the guide elements when the tray is in the in-use position.

2. The arrangement according to claim 1, wherein the first and second toothed means are each formed as toothed segments.

3. The arrangement according to claim 2, wherein the seat back is part of a passenger seat of a motor vehicle.

4. The arrangement according to claim 1, wherein at least one pocket means is formed at an upper portion of at least one of the groove means for accommodating the pawl means.

5. The arrangement according to claim 4, wherein the pawl means is constructed as a two-armed lever including a central section for pivotably mounting the same in the pocket means, a cutout means is provided in a first lever arm of the two-armed lever for accommodating the guide element, and a spring means is provided for biasing the pawl means, said spring means is adapted to engage an end of a second arm of the two-armed lever.

6. The arrangement according to claim 5, wherein means are provided for disengaging the pawl means from the guide elements so as to enable the tray to be displaced from the in-use position to the stowed position.

7. The arrangement according to claim 6, wherein said disengaging means includes a bent lug means provided at an end of the first lever arm, said lug means is bent in a direction of the tray.

8. The arrangement according to claim 6, wherein means are provided in the pocket means for enabling a locking of the pawl means when the tray is in the in-use position.

9. The arrangement according to claim 8, wherein the means for enabling a locking of the pawl means includes a shoulder formed in the pocket means, and the pawl means includes a shoulder portion adapted to be brought into engagement with the shoulder.

10. The arrangement according to claim 9, wherein the second toothed means are arranged in an immediate vicinity of the pawl means.

11. The arrangement according to claim 10, wherein means are provided for displacably accommodating the guide elements in the tray, and means are provided for biasing the guide elements in a longitudinal direction of the tray.

12. The arrangement according to claim 11, wherein the means for accommodating the guide element includes a passage bore extending in parallel to a forward edge of the tray, and the guide elements are formed by ends of a dimensionally stable rod means accommodated in the passage bore.

13. The arrangement according to claim 12, wherein the means for biasing the guide elements includes a spring means disposed in the passage bore.

14. The arrangement according to claim 13, wherein a lamp means is arranged on the backside of the back of the seat in an upper area of the opening.

15. The arrangement according to claim 14, wherein a dimensionally stable molding is mounted on the back of the seat, said molding having the opening formed therein for accommodating the tray.

16. The arrangement according to claim 1, wherein a biased pawl means is provided on an upper end of both of the groove means for respectively engaging the guide elements when the tray is in the in-use position.

* * * * *